Figure 1:
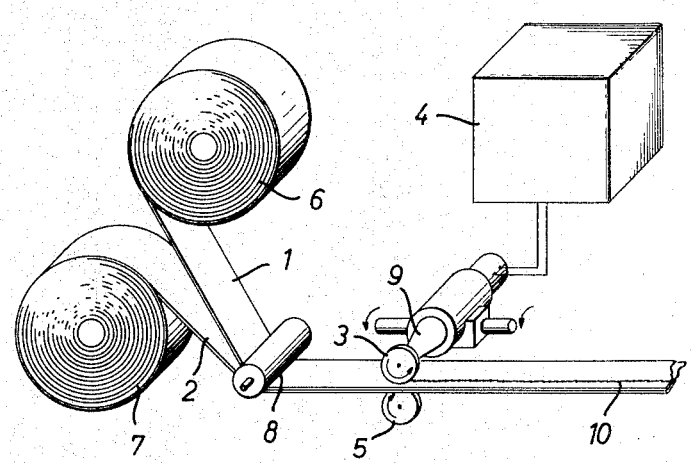

United States Patent Office 3,222,235
Patented Dec. 7, 1965

3,222,235
METHOD OF MANUFACTURING
INFUSION BAGS
Norbert Buchner, Hegnach, Waiblingen, Germany, assignor to Fr. Hesser Maschinenfabrik-Aktiengesellschaft, Stuttgart-Bad Cannstatt, Germany, a corporation of Germany
Filed Nov. 8, 1962, Ser. No. 236,355
Claims priority, application Germany, Dec. 11, 1961,
H 44,366
1 Claim. (Cl. 156—73)

This invention is concerned with the method of manufacturing infusion bags for tea, coffee etc. by bringing layers of non-thermoplastic fibrous packaging materials such as permeable filter paper or the like together and producing jointed seams between said layers.

Hitherto the production of seams in packages of fibrous materials such as paper, cardboard or the like has involved the use of adhesive. In one prior method, for example, a thin film of adhesive in fluid condition is coated on the surfaces which are to be united, and these surfaces are then brought together and pressed. As an alternative, known heat-adhesion processes can be used. In the latter instances the packaging material is provided with a dry, solid and heat-tacky coating over the whole surface, or over only those parts which are to be adhered, and this coating is then heated to produce the adherence.

Bags produced by the methods referred to above have the disadvantages that a special application of adhesive is required, if a heat-tacky coating is not already present for other special reasons, and this adhesive often is detrimental to the packaged commodities in that it may produce changes in the taste thereof, or may mask the taste, of the latter, such as when the contents of the bags is brewed, for example, tea whereby the added coating of adhesive or the heat-tacky layer, and possibly the solvent medium also, may affect the taste of the tea so prepared.

It has been previously known to join a plurality of superimposed strips of soft tissue paper by pressing them together along their edges to form handkerchieves. This simple pressing together of several layers of fibrous structure as paper was sufficient to keep the several layers of the handkerchief together, but the seams produced by this simple pressing were not suited to resist any tractive power which is unavoidable in infusion bags for tea, coffee etc. when the tea, coffee etc. is filled in the bags; furthermore, these prior known seams lose their jointing power in wet condition, so that a bag produced in accordance with this known method would open when the bag is immersed in water to brew the tea, coffee etc.

Surprisingly, it has now been found, in accordance with this invention, that these disadvantages can be overcome if the intended seam formation in the bag is produced without using an adhesive but by a pressing action with superimposed pressure impulses of high frequency. Preferably the frequency of these compression vibrations lies in the ultrasonic range.

The bonding of metal and thermoplastic sheeting by ultrasonic welding is known. Thus, for example, in the case of some metal foils this result is achieved by the fact that the basic molecules of the foils to be united are brought into cohesive contact as a result of the destruction by the pressure impulses of the layer of oxide covering the surface of the foils. This phenomenon now has been found by the applicant to be extremely useful for manufacturing infusion bags, in that the high frequency pressure impulses destroy the fibrous structure and the thereby-pulverized fibre particles mix and bond with the material with which they are required to combine, analogous to the manufacture of parchment paper.

Figure 2:
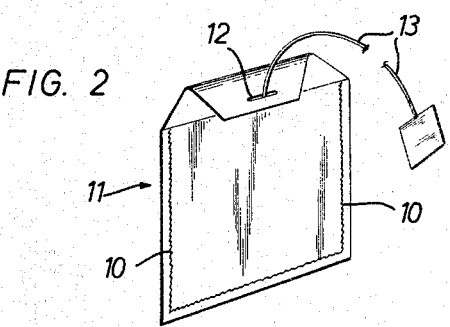

One method of performing this invention is illustrated by the accompanying diagrammatic drawing, wherein FIG. 1 diagrammatically illustrates the production of a a seam, and FIG. 2 shows an infusion bag manufactured according to the invention.

FIG. 1 represents the step of uniting two webs 1 and 2 of strip material by a longitudinal seam in the production of infusion bags. In the same way one or more blanks of paper might be used, also.

The webs 1 and 2 are respectively drawn from reels 6 and 7 at a predetermined speed and are registered together by a roll 8. In this face-to-face state they pass between a pair of discs 3 and 5. The upper disc 3 represents the rotating operative head of a sonotrode 9 which is connected to an ultrasonic generator 4 transmitting pressure impulses of supersonic frequency to the sonotrode.

Disc 5 serves as a counter bearing member or anvil and also rotates. The disc 5 is pressed towards the sonotrode head 3 under a predetermined constant pressure. With this system, therefore, a continuous line pressure is applied along the superimposed webs and superimposed on this are the high frequency pressure impulses from the sonotrode; this produces a sound longitudinal seam, indicated at 10. Good results have been obtained by this arrangement, where the direction of application of the pressure vibrations is parallel to the plane of the layers of material to be united. The seam formation can be carried out continuously or in intermittent fashion.

When using blanks instead of strips the blanks of the paper are first folded into a V, joint seams are formed, by the method of this invention, parallel to the lateral edges by means of ultrasonic impulses, and finally the bag 11 is filled and closed. The closure of the bag 11 may either be made by a closure seam which is formed, in accordance with this invention, with ultrasonic impulses, this being particularly applicable to so-called floating bags, or, in the case of suspended bags which also include a thread 13, can be produced by folding, the folded closure being secured, for example, by a metal clip 12 holding the thread (FIG. 2).

It will be understood that other and desired forms of bag can be produced using the method of the present invention. In this regard reference may be made to the fact that there is no fundamental difficulty, in the case of laminated packaging materials, in replacing the previous heat-sealing method of seam production by the ultrasonic treatment in accordance with the present invention.

Tests have also shown that seams produced in accordance with this method in fibrous packaging materials retain their jointing power even in wet condition, and therefore are especially advantageous for use in tea infusion bags.

I claim:
A method for forming an infusion bag which is adapted for containing a substance which when immersed in a liquid produces a beverage, said method comprising superimposing an even number of layers of non-thermoplastic fibrous permeable filter paper together, applying mechanical pressure to said layers along marginal seams in a direction normal to the layers, superimposing on said mechanical pressure ultrasonic pressure impulses directed parallel to the layers to destroy the fibrous structure at said seams and produce pulverized fibre particles in the layers which mix and bond together, the layers being joined to define an open cavity in which the substance may be introduced after which the layers are sealed to close the cavity, said seams having strength when wet to retain the substance in said cavity while having no effect on the taste of the beverage.

References Cited by the Examiner
UNITED STATES PATENTS

| | | | |
|---|---|---|---|
| 1,771,983 | 7/1930 | Wandel | 161—129 |
| 2,946,120 | 7/1960 | Jones | 156—73 |
| 3,022,814 | 2/1962 | Bodine | 156—73 |

EARL M. BERGERT, *Primary Examiner.*